Patented Sept. 18, 1934

1,973,724

UNITED STATES PATENT OFFICE

1,973,724

METHOD OF INHIBITING DISCOLORATION OF AROMATIC COMPOUNDS

Ralph P. Perkins, Andrew J. Dietzler, and Edward C. Burdick, Midland, Mich., assignors to The Dow Chemical Company, Midland, Mich., a corporation of Michigan No Drawing. Application September 19, 1931, Serial No. 563,894

18 Claims. (Cl. 23—250)

The present invention concerns a new method of treating a class of aromatic compounds susceptible to discoloration on storage, viz. aromatic amines and monohydric phenols, so as to materially reduce the tendency of said compounds to discolor when exposed to the action of light and/or air.

It is well known that both phenols and aromatic amines, though carefully purified, tend to discolor upon exposure to light and/or air, particularly when traces of moisture are present. This action is not clearly understood, but is believed to be due to a partial oxidation of the organic substance by air.

We have now found that hydrazine and related compounds such as hydrazine hydrate, hydrazine salts of weak acids, semi-carbazide, etc. may be incorporated with aromatic amines and monohydric phenols in very small amounts either to prevent completely or to inhibit greatly the aforementioned discoloration of such materials on exposure to light and/or air, even when moisture is present during such exposure. Such mode of protection against discoloration is applicable, however, only to aromatic amines and monohydric phenols which contain no aldo, keto, or strongly acid groups or radicals, the term "strongly acid" being used in this instance and throughout the specification and claims with reference to any acid having a primary dissociation constant greater than $8 \times 10^{-5}$ at 25° C. The present invention, then, consists in a new method of treating a certain class of aromatic compounds susceptible to discoloration through the action of light and/or air, viz. aromatic amines and monohydric phenols, containing no aldo, keto, or strongly acid groupings, so as to inhibit greatly such discoloring action, and in the products obtained through such treatment, such mode of treatment and products obtainable thereby being hereinafter fully described and particularly pointed out in the claims.

Aromatic amines and monohydric phenols may be treated with a hydrazine compound, such as hydrazine, hydrazine hydrate, a hydrazine salt of a weak acid, semicarbazide, etc. in various ways. The hydrazine compound may be incorporated directly with the purified amine or phenol, but it is often more convenient to add the hydrazine compound to the impure amine or phenol and distil the mixture together during the step of purifying said aromatic amine or phenolic compound. Again, aromatic amines and phenolic compounds may be treated with a mixture which will react to form one of the aforementioned hydrazine compounds within the material treated. The aromatic amine or monohydric phenol may, for instance, be treated successively with a hydrazine salt, such as the sulphate and with an alkaline substance, such as sodium hydroxide or lime. The hydrazine compound so liberated, forms a solution with the amine or phenol, while the sodium or calcium sulphate, if said amine or phenol is in a molten condition, forms a precipitate which may be filtered from the solution. The last described mode of operation is well adapted to the preparation of a concentrated solution of a hydrazine compound dissolved in an aromatic amine or phenolic compound, which solution may then conveniently be employed as an agent in adding a desired amount of the hydrazine compound to a larger quantity of the corresponding aromatic amine or phenolic compound.

The following examples describe comparative tests made by exposing solutions of hydrazine compounds dissolved in various aromatic amines and phenols, and samples of the corresponding untreated amines and phenols, to the action of the previously mentioned discoloring agents. In said examples all conditions with respect to quantity of amine or phenol tested, shape, size, and quality of the container employed and intensity of the light to which the samples were exposed were the same for each treated and untreated aromatic amine and phenolic compound tested. It is to be understood that the examples given below are illustrative of but several of the various ways in which the principle of our invention may be employed and that said examples are not to be construed as a limitation on the invention.

Example 1

Three samples of phenol, containing 0.005, 0.010 and 0.030 per cent of hydrazine hydrate, respectively, were simultaneously exposed to the action of direct sunlight along with another sample of carefully purified, untreated phenol. All samples were contained in sealed glass bottles. The untreated phenol sample showed discoloration at the end of 5 hours. The phenol sample containing 0.005 per cent of hydrazine hydrate began to show discoloration at the end of 4 days, the sample containing 0.010 per cent of hydrazine hydrate showed traces of discoloration at the end of 13 days of exposure and discoloration was not detected in the sample containing 0.030 per cent of hydrazine hydrate until after 26 days of exposure.

Example 2

Two samples of ortho-phenylphenol, one consisting of the carefully purified, untreated compound and the other containing 0.010 per cent of hydrazine hydrate, both contained in sealed glass bottles, were exposed to the action of sunlight together. The untreated sample was distinctly discolored at the end of 1.5 hours while the sample containing hydrazine hydrate was but faintly discolored after 5 hours of exposure.

Example 3

Two aniline samples containing 0.010 and 0.020 per cent of hydrazine hydrate, respectively, and a sample of pure, untreated aniline were exposed to the direct action of sunlight together. After 5 hours of exposure, the treated samples showed a faint tinge of discoloration, while the untreated sample was changed to a light brown color. After 6 days of exposure, the treated samples were of light yellow color, while the untreated sample was brown.

Example 4

An aniline sample containing 0.030 per cent of hydrazine mono-benzoate was exposed to the action of direct sunlight along with an equal sized sample of untreated aniline. After 1 hour of exposure, the treated sample had developed a faint yellowish tinge, while the untreated sample had developed a light brown coloration.

Example 5

Two samples of para-phenetidine, containing 0.020 and 0.010 per cent of hydrazine hydrate, respectively, were exposed to the action of light (but not to direct sunlight) along with a sample of untreated para-phenetidine. All samples were contained in sealed glass bottles. At the end of 2 days, the sample containing 0.020 per cent hydrazine hydrate was unchanged, that containing 0.010 per cent of hydrazine hydrate had developed a faint, yellowish tinge, while the untreated sample had developed a distinct yellow coloration. After 4 days of exposure, each treated sample was tinged a faint yellow, while the untreated sample was colored red. After 2.5 months of exposure to light, each treated sample was found to have developed a very light yellow coloration, while the untreated sample had become dark red in color.

Example 6

Two samples of phenol, one containing 0.14 per cent of semicarbazide and the other consisting of the pure untreated compound, were sealed in glass bottles and exposed to the action of direct sunlight. The untreated sample showed discoloration after 2 hours of exposure, while the treated sample was exposed to direct sunlight for 12 hours before traces of discoloration could be detected.

Example 7

Two samples of para-phenetidine containing 0.01 and 0.02 per cent of hydrazine hydrate, respectively, and a sample of pure, untreated para-phenetidine were placed separately in tinned cans and exposed to the action of air, but protected against the action of light. The untreated sample changed from an initial light yellowish color to red in 2 days. The sample containing 0.01 per cent of hydrazine hydrate had developed a reddish tint at the end of 5 days. It was 10 days before a reddish coloration was observable in the sample containing 0.02 per cent of hydrazine hydrate.

The specific aromatic amines and phenolic compounds mentioned in the examples are but illustrative of the general class of compounds susceptible to discoloration, through exposure to light and/or air, which may in all cases be inhibited effectively and in many cases prevented completely by incorporating with said easily discolorable compounds a small fraction of one of the following group of hydrazine compounds:—hydrazine, hydrazine hydrate, hydrazine salts of weak acids, and semicarbazide.

Throughout the claims it shall be understood that the term "weak acid" is employed in referring to an acid having a dissociation constant of less than $8 \times 10^{-5}$ at 25° C. and, conversely, that the term "strong acid" is employed in referring to any acid having a dissociation constant greater than $8 \times 10^{-5}$ at 25° C.

Other modes of applying the principle of our invention may be employed instead of those explained, change being made as regards the method herein disclosed, provided the means stated by any of the following claims or the equivalent of such stated means be employed.

We therefore particularly point out and distinctly claim as our invention:—

1. A method of inhibiting the discoloration of aromatic amines and monohydric phenols, containing no aldo, keto, or strongly acid group, which comprises incorporating therewith at least one compound selected from the class consisting of hydrazine, hydrazine hydrate, a hydrazine salt of a weak acid and semicarbazide.

2. A method of inhibiting the discoloration of aromatic amines and monohydric phenols, containing no aldo, keto, or a compound selected from the class consisting of hydrazine, hydrazine hydrate, a hydrazine salt of a weak acid, and semicarbazide, in amount sufficient to inhibit discoloration, but not more than 0.15 per cent by weight.

3. A method of inhibiting the discoloration of aromatic amines and monohydric phenols, containing no aldo, keto, or strongly acid group, through the action of light and/or air, which comprises incorporating therewith at least one compound selected from the class consisting of hydrazine, hydrazine hydrate, a hydrazine salt of a weak acid and semicarbazide.

4. A method of inhibiting the discoloration of aromatic amines and monohydric phenols, containing no aldo, keto, or strongly acid group, through the action of light and/or air, which comprises incorporating therewith a compound selected from the class consisting of hydrazine, hydrazine hydrate, a hydrazine salt of a weak acid, and semicarbazide, in amount sufficient to inhibit discoloration, but not more than 0.15 per cent by weight.

5. A method of inhibiting the discoloration of aromatic amines and monohydric phenols, containing no aldo, keto, or strongly acid group, through the action of light and/or air, which comprises incorporating therewith a mixture of compounds capable of reacting together to produce a compound selected from the class consisting of hydrazine, hydrazine hydrate, a hydrazine salt of a weak acid and semicarbazide.

6. A method of inhibiting the discoloration of aromatic amines and monohydric phenols, containing no aldo, keto, or strongly acid group, through the action of light and/or air, which comprises incorporating therewith a mixture of a salt of a hydrazine compound and a basic compound, said hydrazine salt and basic compound being capable of interacting to form a compound selected from the class consisting of hydrazine, hydrazine hydrate, semicarbazide and a hydrazine salt of a weak acid, and separating the sodium or calcium salt, so formed, from the resulting solution.

7. A method of inhibiting the discoloration of aniline through the action of light and/or air, which comprises incorporating therewith a compound selected from the class consisting of hydrazine, hydrazine hydrate, a hydrazine salt of a weak acid and/or semicarbazide.

8. A method of inhibiting the discoloration of phenol through the action of light and/or air, which comprises incorporating therewith a compound selected from the class consisting of hydrazine, hydrazine hydrate, a hydrazine salt of a weak acid and/or semicarbazide.

9. A method of inhibiting the discoloration of paraphenetidine through the action of light and/or air, which comprises incorporating therewith a compound selected from the class consisting of hydrazine, hydrazine hydrate, a hydrazine salt of a weak acid and semicarbazide.

10. An improvement in methods for the purification of aromatic amines and monohydric phenols, containing no aldo, keto, or strongly acid group, by distillation of the same, which comprises introducing into the compound to be distilled a compound selected from the class consisting of hydrazine, hydrazine hydrate, a hydrazine salt of a weak acid and semicarbazide.

11. An improvement in methods for the purification of aromatic amines and monohydric phenols, containing no aldo, keto, or strongly acid group, by distillation of the same, which comprises introducing into the compound to be distilled a salt of a hydrazine compound and an alkaline substance which will hydrolyze said hydrazine compound in the presence of the compound to be purified through distillation.

12. As a new composition of matter, a solution comprising a compound selected from the following class of compounds readily discolorable through the action of light and/or air:—aromatic amines and monohydric phenols, containing no aldo, keto, or strongly acid group, and a compound selected from the class consisting of hydrazine, hydrazine hydrate, a hydrazine salt of a weak acid and semicarbazide.

13. As a new composition of matter, a solution comprising, as major constituent, a compound selected from the following class of compounds readily discolorable through the action of light and/or air:—aromatic amines and monohydric phenols, containing no aldo, keto, or strongly acid group, and as a minor constituent, a compound selected from the class consisting of hydrazine, hydrazine hydrate, a hydrazine salt of a weak acid and semicarbazide.

14. As a new composition of matter, a solution comprising aniline as major constituent and, as a minor constituent, a compound selected from the class consisting of hydrazine, hydrazine hydrate, a hydrazine salt of a weak acid and semicarbazide.

15. As a new composition of matter, a solution comprising phenol as major constituent and, as a minor constituent, a compound selected from the class consisting of hydrazine, hydrazine hydrate, a hydrazine salt of a weak acid and semicarbazide.

16. As a new composition of matter, a solution comprising para-phenetidine as major constituent and, as a minor constituent, a compound selected from the class consisting of hydrazine, hydrazine hydrate, a hydrazine salt of a weak acid and semicarbazide.

17. As a new composition of matter, a solution comprising as major constituent an aromatic amine containing no aldo, keto or strongly acid group, and as a minor constituent a compound selected from the class consisting of hydrazine, hydrazine hydrate, a hydrazine salt of a weak acid and semicarbazide.

18. As a new composition of matter, a solution comprising as major constituent a monohydric phenol containing no aldo, keto or strongly acid group, and as a minor constituent a compound selected from the class consisting of hydrazine, hydrazine hydrate, a hydrazine salt of a weak acid and semicarbazide.

RALPH P. PERKINS.
ANDREW J. DIETZLER.
EDWARD C. BURDICK.